(12) United States Patent
Kunieda et al.

(10) Patent No.: US 10,984,623 B2
(45) Date of Patent: Apr. 20, 2021

(54) GATE DEVICE AND GATE DEVICE ARRANGEMENT STRUCTURE

(71) Applicant: PANASONIC INTELLECTUAL PROPERTY MANAGEMENT CO., LTD., Osaka (JP)

(72) Inventors: Yoshinori Kunieda, Tokyo (JP); Masao Kubota, Tokyo (JP); Hiroyuki Matsumoto, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/334,213

(22) PCT Filed: Sep. 15, 2017

(86) PCT No.: PCT/JP2017/033382
§ 371 (c)(1),
(2) Date: Mar. 18, 2019

(87) PCT Pub. No.: WO2018/061813
PCT Pub. Date: Apr. 5, 2018

(65) Prior Publication Data
US 2019/0279446 A1    Sep. 12, 2019

(30) Foreign Application Priority Data

Sep. 30, 2016  (JP) .............................. JP2016-194331

(51) Int. Cl.
*G07C 9/32* (2020.01)
*G07C 9/00* (2020.01)
(Continued)

(52) U.S. Cl.
CPC ................ *G07C 9/32* (2020.01); *E06B 11/02* (2013.01); *G06K 9/00771* (2013.01);
(Continued)

(58) Field of Classification Search
CPC ..... G07C 9/00134; G07C 9/025; E06B 11/02; G06K 9/00771; G07B 15/00; H04N 7/183
See application file for complete search history.

(56) References Cited

U.S. PATENT DOCUMENTS

| 6,577,286 B1 * | 6/2003 | Jang | ....................... G09G 3/005 345/31 |
| 8,618,909 B1 * | 12/2013 | Clausen | ................. G07C 11/00 340/5.7 |

(Continued)

FOREIGN PATENT DOCUMENTS

| CN | 204990703 U | 1/2016 |
| CN | 105590455 A | 5/2016 |

(Continued)

OTHER PUBLICATIONS

Official Communication issued in International Bureau of WIPO Patent Application No. PCT/JP2017/033382, dated Nov. 21, 2017.
(Continued)

*Primary Examiner* — Thomas D Alunkal
(74) *Attorney, Agent, or Firm* — Greenblum & Bernstein, P.L.C.

(57) ABSTRACT

A gate device disposed between a first space where a person waiting for passing through exists and a second space where a person already passed through exists, the device including: a gate main body disposed along a path through which the person existing in the first space passes when the person moves to the second space; and a shutter for blocking or opening the path. Furthermore, in plan view, a width of a first end portion positioned on a first space side in a short direction is narrower than a width of a second end portion positioned on a second space side in the short direction of the gate main body.

10 Claims, 11 Drawing Sheets

(51) Int. Cl.
  *E06B 11/02*    (2006.01)
  *G06K 9/00*     (2006.01)
  *G07B 15/00*    (2011.01)
  *H04N 7/18*     (2006.01)
  *G07C 9/15*     (2020.01)
  *G07C 9/26*     (2020.01)

(52) U.S. Cl.
  CPC ............... *G07B 15/00* (2013.01); *G07C 9/15* (2020.01); *H04N 7/183* (2013.01); *G07C 9/26* (2020.01)

(56) References Cited

U.S. PATENT DOCUMENTS

| | | | | |
|---|---|---|---|---|
| 9,524,598 | B2* | 12/2016 | Jang | G06K 9/00288 |
| 10,096,180 | B2* | 10/2018 | Warnitz | G07C 9/10 |
| 2001/0048584 | A1* | 12/2001 | Rosen | F16M 13/027 |
| | | | | 361/679.07 |
| 2002/0135541 | A1* | 9/2002 | Kowalewski | G09F 9/33 |
| | | | | 345/31 |
| 2007/0133844 | A1* | 6/2007 | Waehner | G06K 9/2036 |
| | | | | 382/118 |
| 2009/0032585 | A1* | 2/2009 | Kocznar | G07C 9/10 |
| | | | | 235/382 |
| 2009/0322866 | A1* | 12/2009 | Stotz | G07C 9/257 |
| | | | | 348/77 |
| 2010/0171681 | A1* | 7/2010 | Cabanas | G03B 25/02 |
| | | | | 345/31 |
| 2018/0018838 | A1* | 1/2018 | Fankhauser | G06K 19/06046 |

FOREIGN PATENT DOCUMENTS

| | | |
|---|---|---|
| EP | 1990777 A2 | 11/2008 |
| JP | 3047309 U | 4/1998 |
| JP | 2007-179120 A | 7/2007 |
| JP | 2010-198244 A | 9/2010 |
| JP | 4943000 B2 | 5/2012 |

OTHER PUBLICATIONS

The Extended European Search Report dated Sep. 9, 2019 for the related European Patent Application No. 17855769.0.

English Translation of Chinese Search Report dated Feb. 2, 2021 for the related Chinese Patent Application No. 201780058280.3.

* cited by examiner

GATE DEVICE AND GATE DEVICE ARRANGEMENT STRUCTURE

TECHNICAL FIELD

The present disclosure relates to a gate device and a gate device arrangement structure.

BACKGROUND ART

There is a place where only specific permitted a person can pass for reasons of security and the like in various facilities such as an airport and an event cite. In such a place, a gate device allowing only permitted a person to pass is disposed.

For example, a gate device disposed in an entrance of various facilities, an event cite, or the like is disclosed in PTL 1.

CITATION LIST

Patent Literature

PTL 1: Japanese Patent No. 4943000 B2

SUMMARY OF THE INVENTION

Technical Problem

An aspect of the present disclosure provides a gate device and a gate device arrangement structure which can be arranged in various disposition patterns and reduce a sense of oppression to a user.

Solution to Problem

According to an aspect of the disclosure, there is provided a gate device disposed between a first space where a person waiting for passing through exists and a second space where a person already passed through exists, the device including: a gate main body disposed along a path through which the person existing in the first space passes when the person moves to the second space; and a shutter for blocking or opening the path. Furthermore, in plan view, a width of a first end portion positioned on a first space side in a short direction is narrower than a width of a second end portion positioned on a second space side in the short direction of the gate main body.

According to the disclosure, there is provided a gate device arrangement structure, in which a plurality of gate devices according to an aspect of the present disclosure are disposed, in which two gate devices are disposed so that respective first end portions face each other, in which the respective first end portions of the two gate devices are connected so as to block a movement of a person, and in which gate devices other than the two gate devices are disposed in parallel with either one of the two gate devices so as to widen the first space as the gate devices are away from the two gate devices.

Advantageous Effects of Invention

According to the aspect of the present disclosure, it is possible to arrange the gate device in various disposition patterns to reduce a sense of oppression to a user.

Further advantages and effects in the aspect of the present disclosure will be apparent from the specification and the drawings. Such advantages and/or effects are provided by some embodiments and features described in the specification and the drawings, respectively, but there is no need to necessarily provide all features to obtain one or more of the same features.

DESCRIPTION OF EMBODIMENTS

Hereinafter, embodiments will be described in detail with reference to the drawings as appropriate. However, detailed description may be omitted more than necessary. For example, detailed description of already well-known matters and redundant explanation on substantially the same configuration may be omitted. This is to avoid the unnecessary redundancy of the following description and to facilitate understanding by those skilled in the art.

It is to be noted that the accompanying drawings and the following description are provided to enable those skilled in the art to fully understand the present disclosure, and are not intended to limit the claimed subject matter.

Embodiments

1. Configuration

Figure 1:
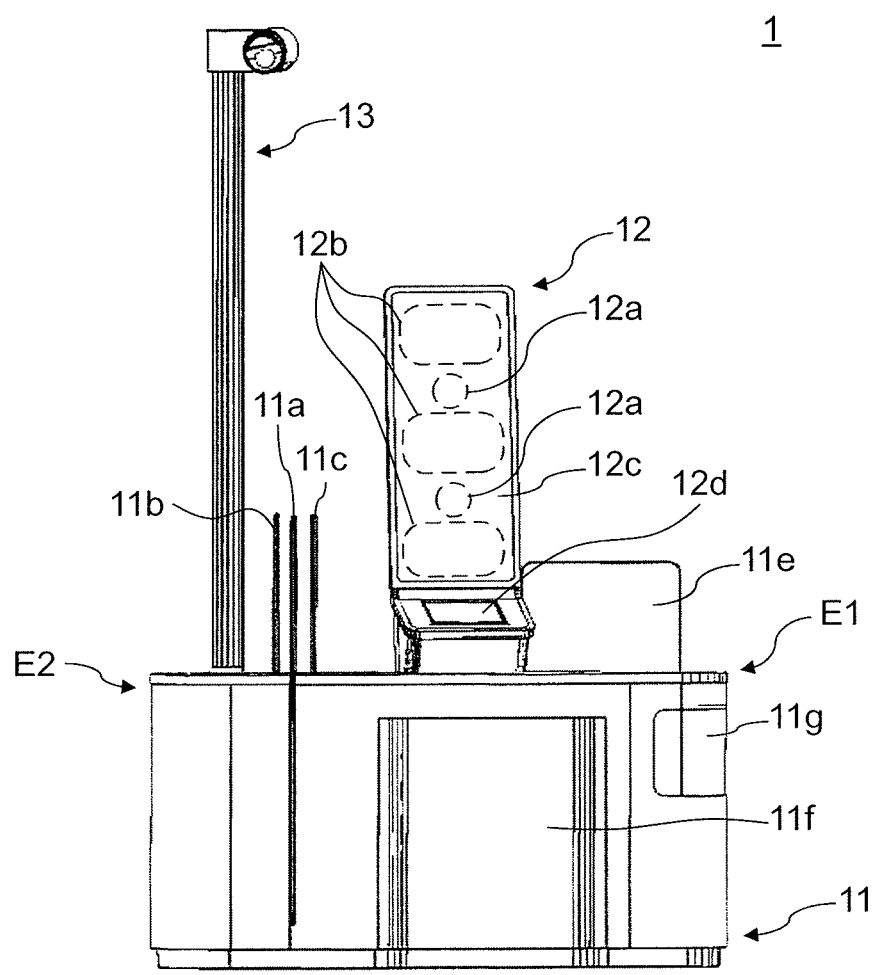
FIG. 1 is a front view illustrating an example of a gate device according to an embodiment.
Figure 2:
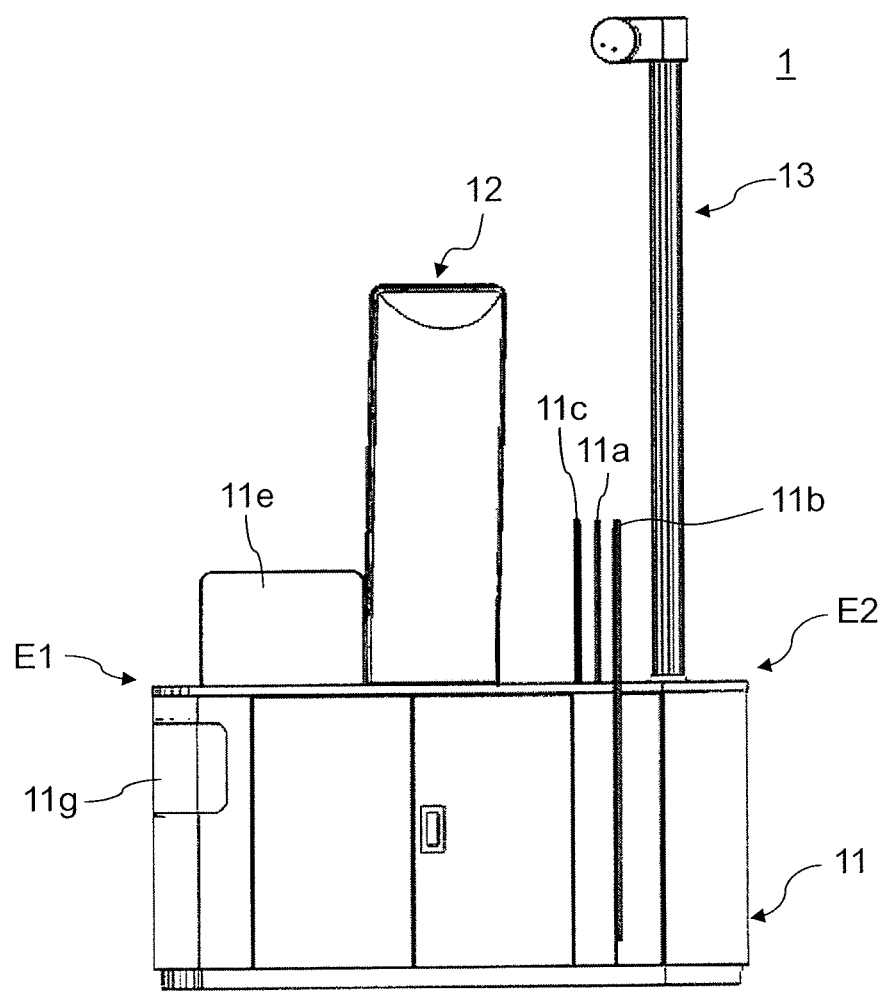
FIG. 2 is a rear view illustrating an example of the gate device according to the embodiment.
Figure 3:
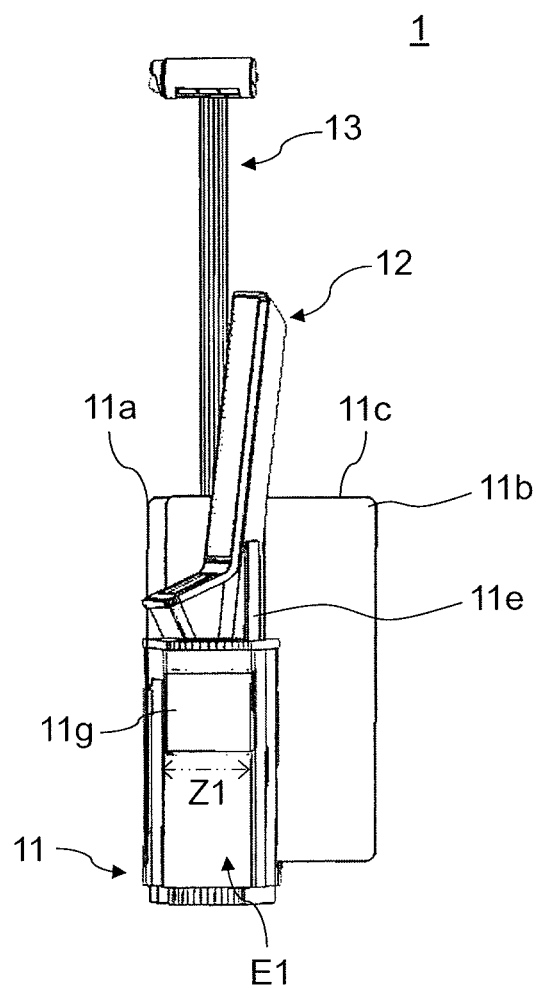
FIG. 3 is a right side view illustrating an example of the gate device according to the embodiment.
Figure 4:
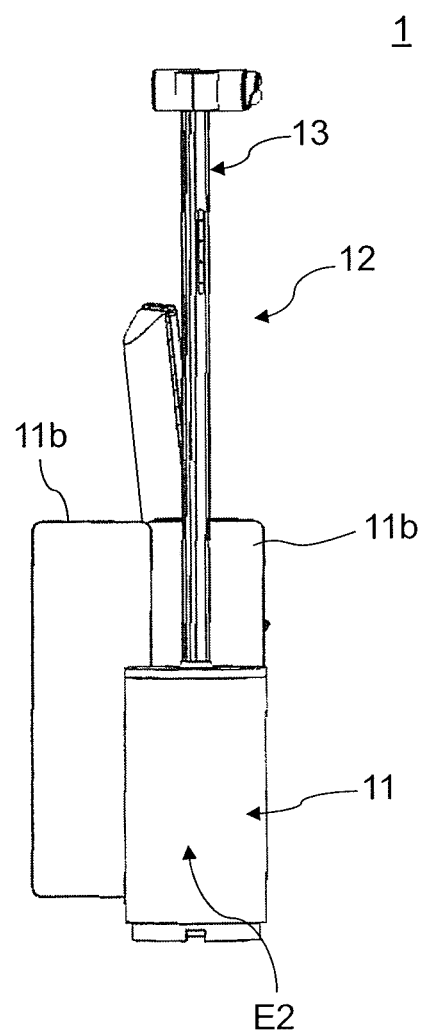
FIG. 4 is a left side view illustrating an example of the gate device according to the embodiment.
Figure 5:
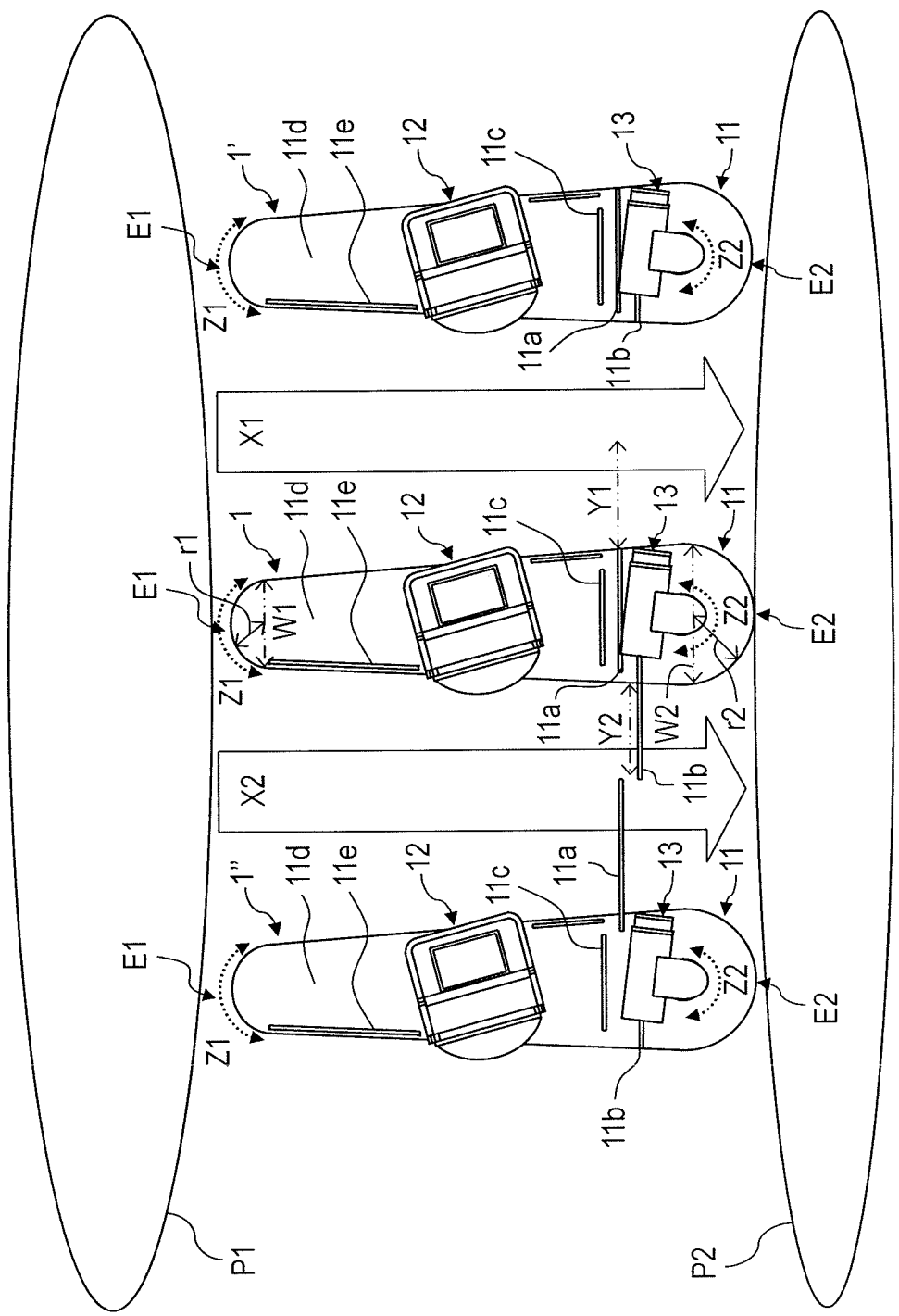
FIG. 5 is a top view illustrating an example of the gate device according to the embodiment.

Gate device 1 according to an embodiment will be described with reference to FIGS. 1 to 5. FIG. 1 is a front view illustrating gate device 1 according to the embodiment. FIG. 2 is a rear view of gate device 1 according to the embodiment. FIG. 3 is a right side view of gate device 1 according to the embodiment. FIG. 4 is a left side view of gate device 1 according to the embodiment. FIG. 5 is a top view of gate device 1 according to the embodiment. For convenience of explanation, FIG. 5 illustrates gate device 1' disposed on a front side and gate device 1" disposed on a rear side of gate device 1 having the same configuration as that of gate device 1.

Gate device 1 according to the embodiment is applied to a gate system that automatically performs a face recognition operation to be executed in an examination of immigration. The face recognition operation is an operation of comparing and collating a face of a person to be examined with a face photograph attached to (or embedded as data) a passport possessed by the person, and checking that the person to be examined is an authorized holder of the passport. Gate device 1 automatically performs the face recognition operation and performs opening and closing of the gate or the like according to a result of the face recognition.

Gate device 1 is disposed between space P1 (first space) where a person waiting for passing through gate device 1 exists before the face recognition is performed and space P2 (second space) where a person already passed through gate device 1 in which the face recognition is performed exists. Among people before the face recognition, a person (hereinafter, referred to as a target person) to be next face-authenticated enters a front side of gate device 1 from an entrance side (right side of FIG. 1) of gate device 1 and the face recognition is performed. In a case where the passage of gate device 1 is permitted as a result of the face recognition, the target person leaves to an exit side (left side of FIG. 1) of gate device 1.

Gate device 1 is connected to a control device (not illustrated) in a wired or wireless manner, and operates under control of the control device. The control device is, for example, a PC having a CPU and a memory, and performs centralized control of gate device 1 and other gate devices (for example, gate device 1' and gate device 1" in FIG. 5) disposed together with gate device 1.

Gate device 1 mainly includes gate main body 11, two shutters (first shutter 11a and second shutter 11b), face recognition device 12, and structure 13. Hereinafter, each configuration will be described.

1.1 Gate Main Body and Shutter

Gate main body 11 is a casing disposed along path X1 through which the target person existing in space P1 passes when moving to space P2. Gate main body 11 has a size in which a length in a vertical direction is substantially 78 cm and a length in a longitudinal direction is substantially 150 cm.

As illustrated in FIG. 5, width W1 of end portion E1 (first end portion) positioned on a space P1 side in a short direction substantially perpendicular to the longitudinal direction of gate main body 11 is narrower than width W2 of end portion E2 (second end portion) positioned on a space P2 side in the short direction. That is, gate main body 11 has a shape in which the width tapers from end portion E2 to end portion E1.

Specifically, end portion E1 and end portion E2 respectively have an arc shape in plan view. The arc shape of end portion E1 and the arc shape of end portion E2 are connected by a straight line. Curvature radius r1 of end portion E1 is smaller than curvature radius r2 of end portion E2. For example, curvature radius r1 is substantially 12 cm and curvature radius r2 is substantially 20 cm.

A part of first shutter 11a is accommodated in gate main body 11. First shutter 11a is connected to a driver (not illustrated) such as a motor or an actuator. The driver is operated, so that first shutter 11a moves in a direction indicated by arrow Y1 and performs an operation of blocking or opening of the path through which the target person passes. In first shutter 11a, when opening path X1, a substantially entire width of the shutter is accommodated in gate main body 11. In addition, first shutter 11a moves to a position where substantially ½ of the width of path X1 is blocked when path X1 is blocked. First shutter 11a interlocks with second shutter 11b of gate device 1' to perform the operation of blocking or opening of path X1.

A part of second shutter 11b is accommodated in gate main body 11. Second shutter 11b is connected to a driver (not illustrated) such as a motor or an actuator. The driver is operated, so that second shutter 11b moves in a direction indicated by arrow Y2 and performs an operation of blocking or opening of a path on a rear side. In second shutter 11b, when opening path X2, a substantially entire width of the shutter is accommodated in gate main body 11. In addition, second shutter 11b moves to a position where substantially ½ of the width of path X2 is blocked when path X2 is blocked. Second shutter 11b interlocks with first shutter 11a of gate device 1" to perform the operation of blocking or opening of path X2 on the rear side.

FIG. 5 illustrates a state where path X1 of gate device 1 on the front side is opened and illustrates a state where path X2 on the rear side is blocked.

Gate main body 11 includes protection plate 11c, baggage holding space 11d, fixed plate 11e, package holding space 11f, and entry guide sign 11g.

Protection plate 11c is provided to be fixed between first shutter 11a and face recognition device 12. Protection plate 11c is provided, so that for example, when the operation of blocking or opening of first shutter 11a and/or second shutter 11b is performed, it is possible to prevent an accident such as the hand of the person passing through gate device 1 being pinched in first shutter 11a and/or second shutter 11b.

Baggage holding space 11d is a space which is provided on the entrance side of face recognition device 12 (on an upper surface of the gate main body) and temporarily holds baggage of the person who is to be face-authenticated in face recognition device 12. Fixed plate 11e is provided on the rear side of baggage holding space 11d in order to prevent theft or the like of the baggage placed in baggage holding space 11d.

Package holding space 11f is a space formed by recessing inwardly a part of gate main body 11 on the front side. A package such as a carry case with casters carried by a person who is to be face-authenticated in face recognition device 12 is temporarily placed in package holding space 11f.

Entry guide sign 11g (first display device) is disposed on the entrance side in gate main body 11, that is, at end portion E1 on the right side with respect to the front side. Entry guide sign 11g is a display device indicating whether or not to enter gate device 1. For example, entry guide sign 11g is a liquid crystal display or the like, and in a case where it is possible to enter gate device 1, a blue arrow is displayed, and in a case where it is not possible to enter gate device 1, a red entry prohibited mark is displayed.

Entry guide sign 11g is disposed rotatably in a horizontal direction (arrow Z1 direction of FIGS. 3 and 5) of gate main body 11. Gate device 1 has an operating portion (not illustrated) for controlling a rotation position of entry guide sign 11g. The operating portion is, for example, a knob or the like provided inside gate main body 11. When gate device 1 is installed, an installation worker or the like operates the knob, so that entry guide sign 11g is directed in a desired direction.

Entry guide sign 11g is configured such that display contents change in accordance with a use situation of gate device 1. As an example, the display contents of entry guide sign 11g change in accordance with a sensing state of a human sensor (not illustrated) provided in gate device 1. That is, in a case where the human sensor senses the presence of the person in the path of gate device 1, entry guide sign 11g indicates that entry to gate device 1 cannot be performed. In addition, in a case where the human sensor does not sense the presence of the person in the path of gate device 1, entry guide sign 11g indicates that entry to gate device 1 can be performed.

1.2 Face Recognition Device

Face recognition device 12 mainly includes two cameras 12a, three displays 12b, half mirror 12c, and passport reader 12d. Face recognition device 12 adopts a configuration in which cameras 12a, displays 12b, and passport reader 12d are integrated.

Camera 12a captures a face image of the target person standing at a position facing face recognition device 12. Camera 12a outputs the captured face image to the control device. Camera 12a may have a function (vital sensing function) of detecting a biological reaction such as a pulse wave of the target person who is to be face-authenticated.

A plurality of cameras 12a are provided in a height direction of face recognition device 12 and capture the face image in accordance with a height or the like of the target person. For example, the plurality of cameras 12a may recognize a position of the face based on feature points such as eyes and mouth in each imaging range, and camera 12a capable of capturing a front side of the face may perform capturing of the face image.

Display 12b displays character information or the like for explaining a procedure related to the face recognition to the target person. The face recognition is performed to the target person based on the character information displayed on display 12b.

Half mirror 12c is disposed at a position at which camera 12a and display 12b are covered. Camera 12a and display 12b are covered by half mirror 12c, so that the target person visually recognizes the character information or the like displayed on display 12b, but the face recognition is performed to the target person without being conscious of the presence of camera 12a.

Passport reader 12d reads the passport placed on a glass surface by the target person with a scanner (not illustrated) or the like provided therein to acquire the face image from the face photograph (or from data recorded in the passport) attached to the passport. Passport reader 12d outputs the acquired face image to the control device.

The control device compares and collates the face image acquired from camera 12a with the face image acquired from passport reader 12d, and determines whether or not the target person is the authorized holder of the passport. In a case where the target person is the authorized holder of the passport, the control device permits the passage of the target person and opens the path. In a case where the target person is not the authorized holder of the passport, the control device maintains a state where the path is blocked. In this case, the control device may allow display 12b to display the character information instructing the target person to whom the face recognition is performed again.

1.3 Structure

Figure 6:
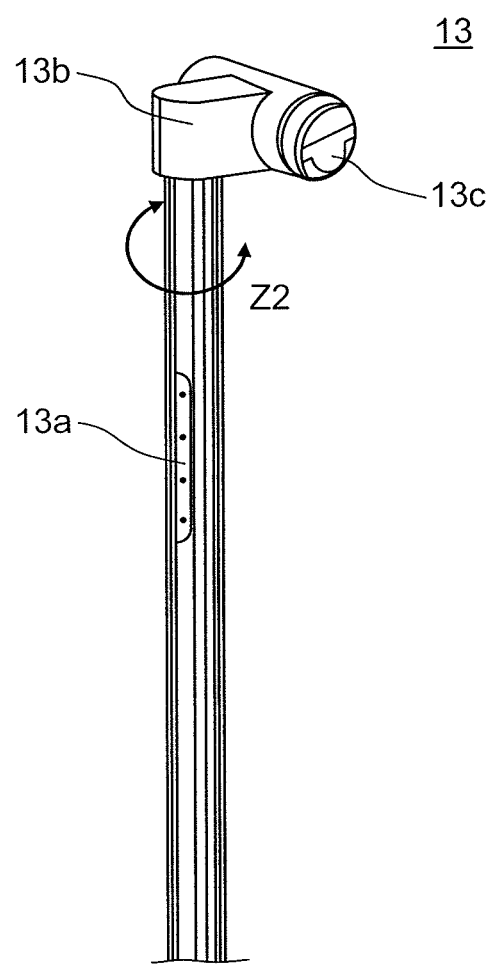
FIG. 6 is an enlarged perspective view of an example of a structure.
Figure 7:
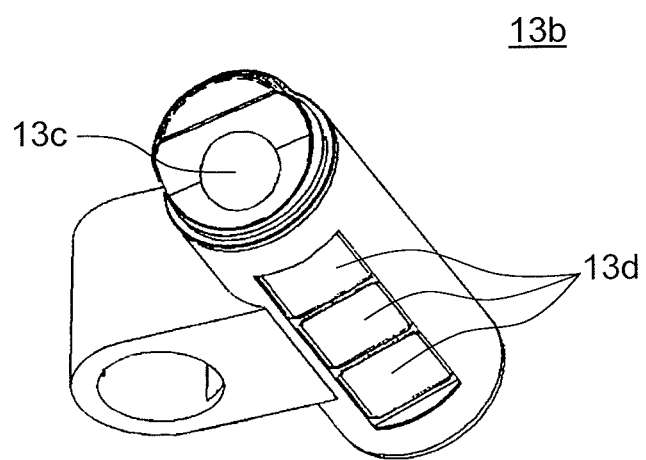
FIG. 7 is an enlarged perspective view of a fraud detecting sensor provided in the structure.

FIG. 6 is an enlarged perspective view of an example of structure 13. FIG. 7 is an enlarged perspective view of fraud detecting sensor 13b provided in structure 13.

Structure 13 is a pole extending upward from the upper surface of gate main body 11. Structure 13 is disposed rotatably in the horizontal direction (arrow Z2 direction of FIGS. 5 and 6) with respect to gate main body 11. Structure 13 includes display device 13a and fraud detecting sensor 13b.

Display device 13a is disposed on a side surface of structure 13. Display device 13a is directed to an office space where, for example, an examiner performs work at the place of immigration examination, by rotating structure 13 in the horizontal direction. Display device 13a indicates an operation state (for example, a progress state of a recognition operation) in gate device 1. For example, display device 13a has a configuration in which a plurality of light emitting diodes (LEDs) are arranged in the vertical direction, and indicates a progress state of an recognition process in gate device 1 by the number, the order, or the like of lighting of the LEDs.

Fraud detecting sensor 13b is a cylindrical casing disposed rotatably in arrow Z2 direction with respect to structure 13 at an upper end portion of structure 13. Fraud detecting sensor 13b and structure 13 are independently rotatable. That is, the orientation of fraud detecting sensor 13b and the orientation of display device 13a can be respectively changed.

Fraud detecting sensor 13b has first sensing device 13c and second sensing device 13d. First sensing device 13c is provided on a bottom surface of the cylindrical casing and second sensing device 13d is provided on the side surface of the cylindrical casing. First sensing device 13c and second sensing device 13d are disposed so as to have detecting ranges different from each other. In a case where the detecting range of first sensing device 13c or second sensing device 13d is sufficiently wide, there is no problem even if both the detecting ranges are overlapped.

Specifically, first sensing device 13c detects a person or the like passing through path X1 (see FIG. 5) of gate device 1 on the front side. Second sensing device 13d detects a person or the like passing through path X2 (see FIG. 5) of gate device 1 on the rear side. For example, first sensing device 13c is a monitoring camera acquiring an image and second sensing device 13d is a three-dimensional distance image sensor detecting a distance to an object existing in the detecting range.

First sensing device 13c and second sensing device 13d respectively output detection results to the control device. The control device performs a process such as an image process with respect to the detection result of first sensing device 13c and monitors a state of the person passing through path X1. In addition, the control device performs a process such as an image process with respect to the detection result of second sensing device 13d and monitors a state of the person passing through path X2. For example, the control device determines whether or not the object in the detecting range is a person or determines the number of people or the like from the detection result of second sensing device 13d.

Since the size of gate device 1 having the configuration described above is small, gate device 1 can be arranged in various patterns according to the space to be disposed, the number thereof to be disposed, and the like. Hereinafter, an example of an arrangement structure of gate devices 1 will be described.

2. Disposition

Figure 8:
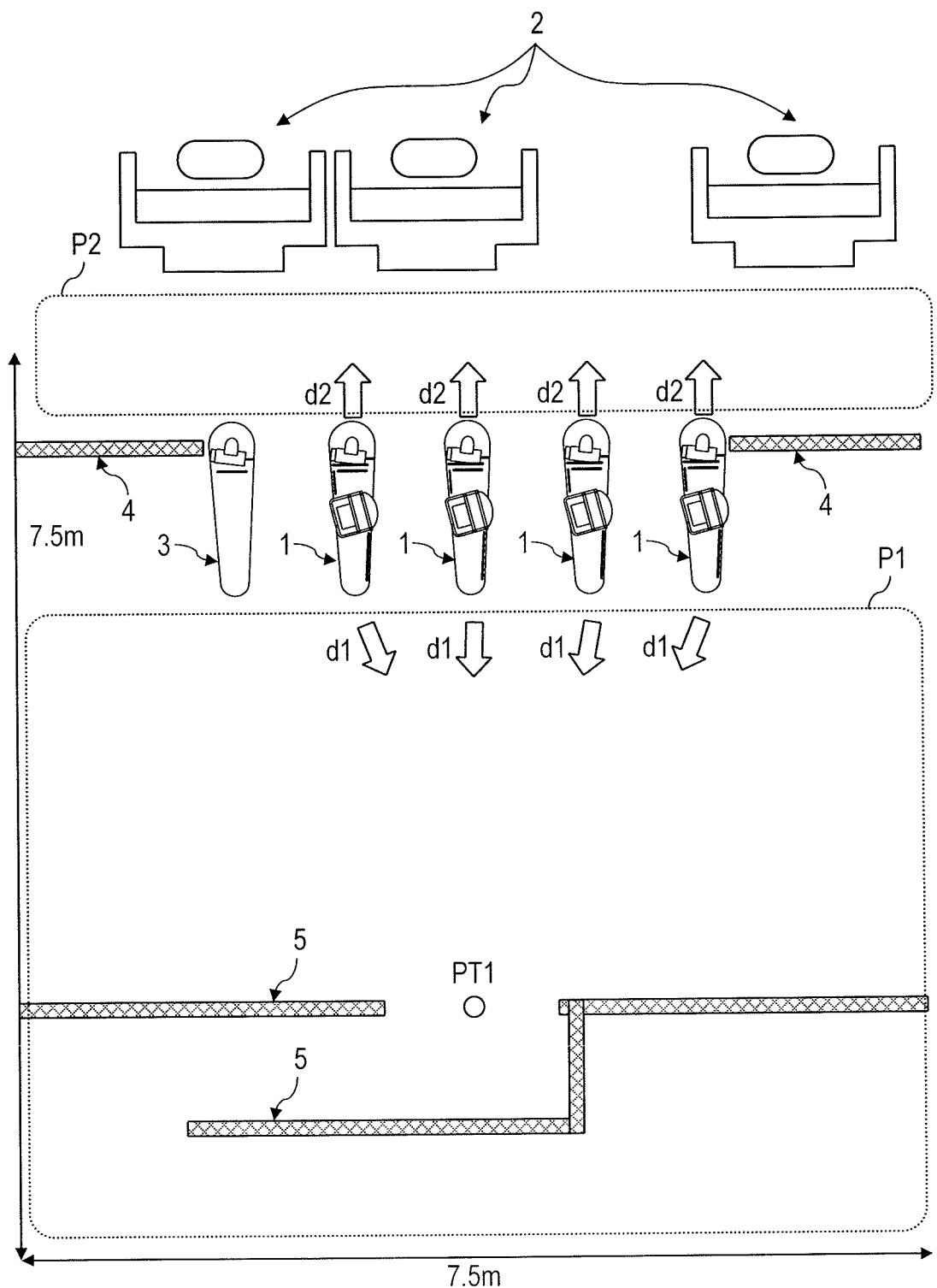
FIG. 8 is a view illustrating an example in which four gate devices are disposed.
Figure 9:
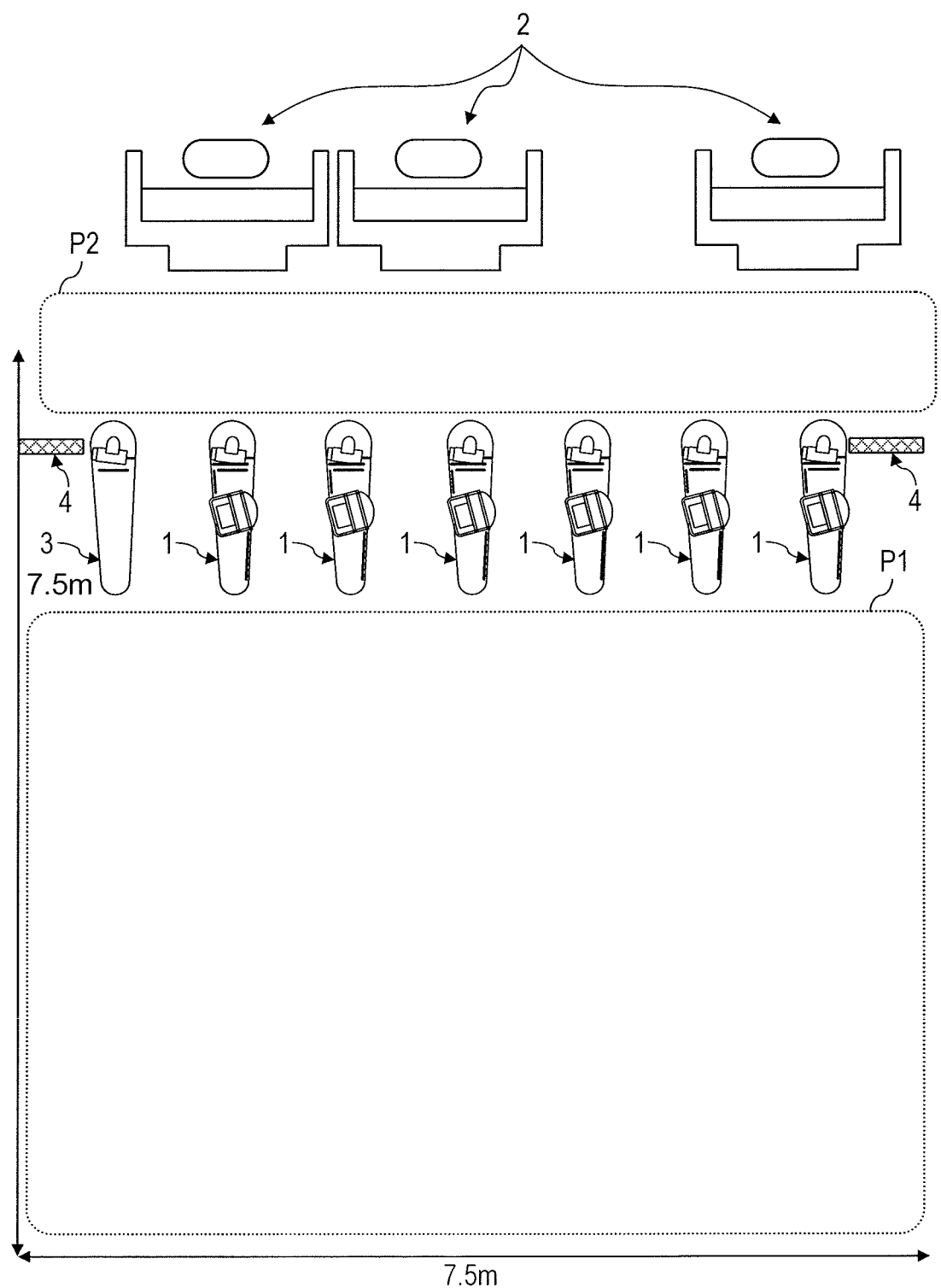
FIG. 9 is a view illustrating an example in which six gate devices are disposed.
Figure 10:
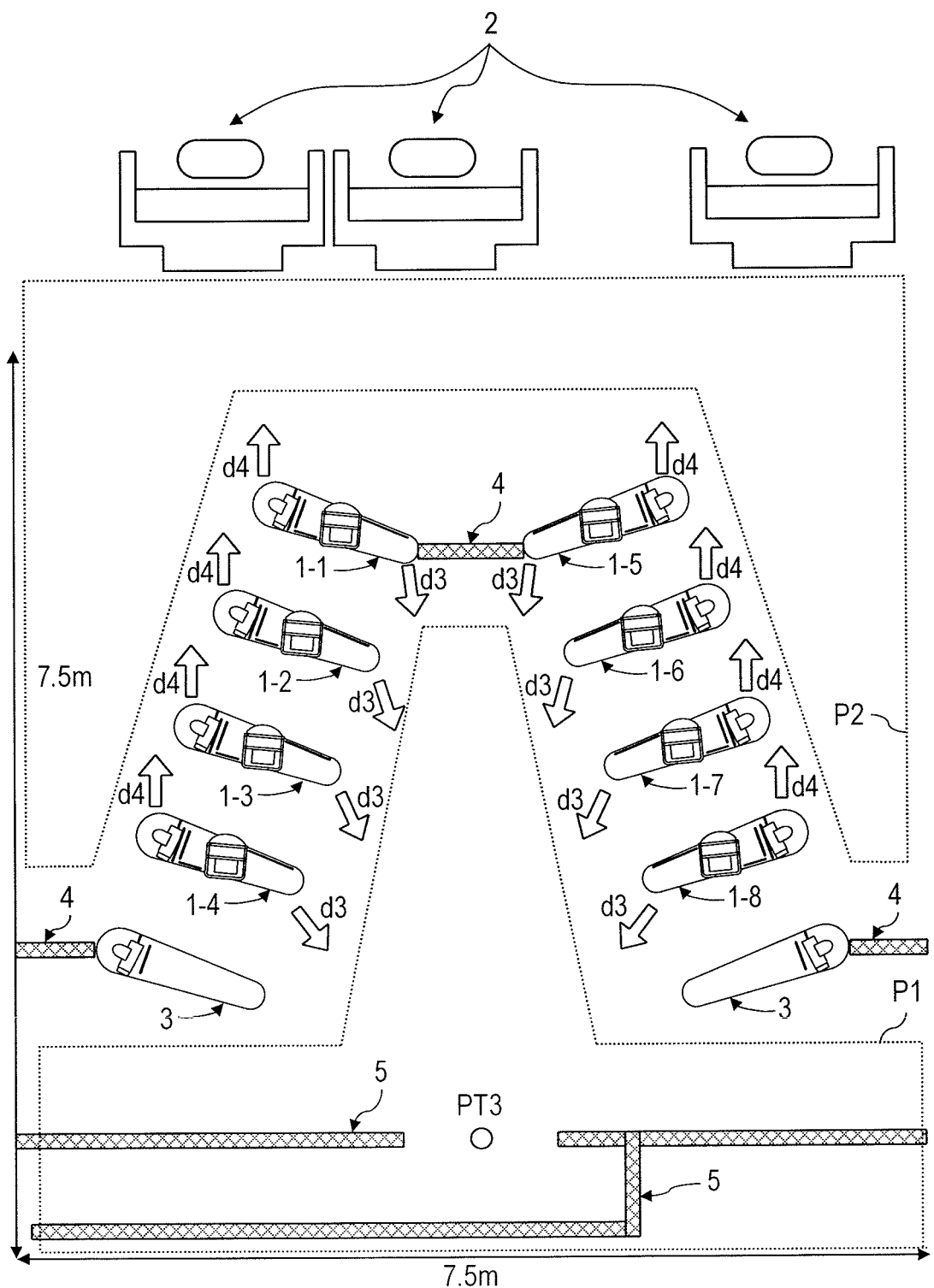
FIG. 10 is a view illustrating an example in which eight gate devices are disposed.
Figure 11:
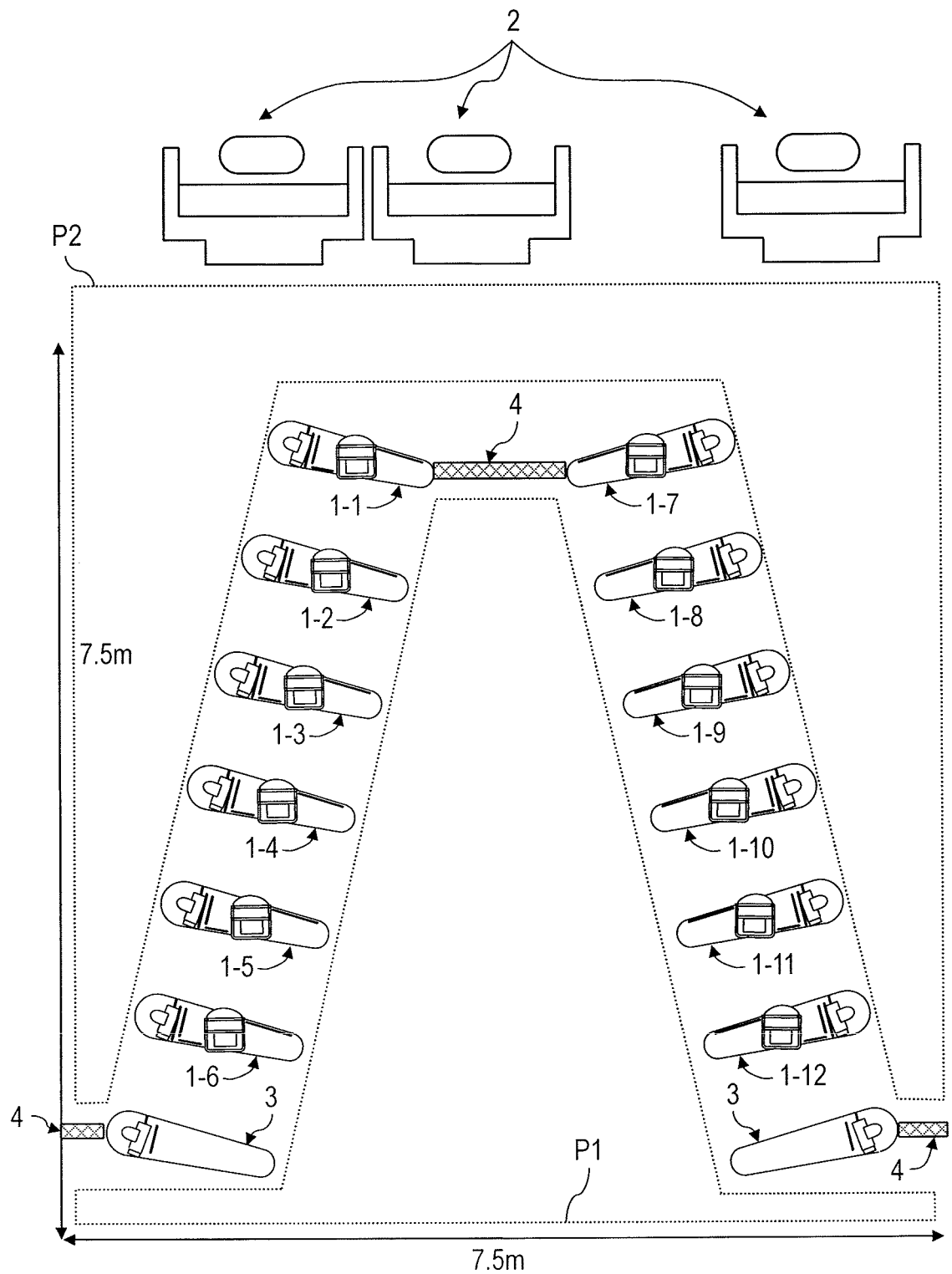
FIG. 11 is a view illustrating an example in which twelve gate devices are disposed.

FIG. 8 is a view illustrating an example in which four gate devices 1 are disposed. FIG. 9 is a view illustrating an example in which six gate devices 1 are disposed. FIG. 10 is a view illustrating an example in which eight gate devices 1 are arranged. FIG. 11 is a view illustrating an example in which twelve gate devices 1 are disposed.

FIGS. 8 to 11 illustrate disposition examples in which a plurality of gate devices 1 are disposed in a square space of 7.5 m in the lateral direction and 7.5 m in the longitudinal direction. In addition, FIGS. 8 to 11 illustrate office space 2 where the examiner performs work of the immigration examination together with gate device 1. In addition, FIGS. 8 to 11 illustrate auxiliary device 3 excluding some functions and/or configurations from the functions and/or configurations of gate device 1. Auxiliary device 3 in the embodiment excludes, for example, first shutter 11a, entry guide sign 11g, face recognition device 12, or the like from gate device 1, and performs blocking and opening of the path of auxiliary device 3 on the rear side, and monitoring in the path. In addition, FIGS. 8 to 11 illustrate partitions 4 for partitioning space P1 and space P2. In addition, FIGS. 8 to 11 illustrate partitions 5 for forming a row of people waiting for passage of the gate device.

2.1 Parallel Type Layout

FIGS. 8 and 9 illustrate a parallel type layout in which gate devices 1 are disposed in parallel in the lateral direction of the square space.

In such a layout, entry guide sign 11g of each gate device 1 is rotated to direct to the vicinity of a head of a waiting row of people before recognition. For example, in FIG. 8, in a case where the vicinity of the head of the waiting row of people before the recognition is point PT1, entry guide sign 11g of each gate device 1 is directed in a direction indicated by arrow d1.

In such a layout, display device 13a of each gate device 1 is rotated to direct toward the examiner performing work in office space 2. For example, in FIG. 8, display device 13a of each gate device 1 is directed in a direction indicated by arrow d2.

In a case where the number of units to be disposed is small with respect to the space (for example, the length in the lateral direction) to be disposed, the parallel type layout illustrated in FIGS. 8 and 9 is adopted. On the other hand, in case where the number of units to be disposed is large with respect to the space to be disposed, a fishbone type layout which is described later may be adopted.

2.2 Fishbone Type Layout

FIGS. 10 and 11 illustrate the fishbone type layout. Gate devices 1-1 to 1-4 of FIG. 10 and gate devices 1-1 to 1-6 of FIG. 11 have the same configuration as that of gate device 1 illustrated in FIGS. 1 to 5. On the other hand, gate devices 1-5 to 1-8 of FIG. 10 and gate devices 1-7 to 1-12 of FIG. 11 have a configuration in which gate device 1 illustrated in FIGS. 1 to 5 is inverted in a mirror image so that the person enters from the left side with respect to the front side.

In FIG. 10, there are two sets of a set of four gate devices 1 disposed in parallel and the two sets are disposed to face each other.

Specifically, gate device 1-1 and gate device 1-5 are respectively disposed so that respective end portions E1 face each other. End portions E1 of gate device 1-1 and gate device 1-5 are connected by a partition or the like so as to block the movement of the person between space P1 and space P2. Gate device 1-2 to gate device 1-4 are disposed in parallel with gate device 1-1, and gate device 1-6 to gate device 1-8 are disposed in parallel with gate device 1-5. In this case, gate device 1-2 to gate device 1-4, and gate device 1-6 to gate device 1-8 are disposed so as to widen space P1 as they are away from gate device 1-1 and gate device 1-5.

In addition, in FIG. 11, there are two sets of a set of six gate devices 1 disposed in parallel and the two sets are disposed to face each other.

Specifically, gate device 1-1 and gate device 1-7 are respectively disposed so that respective end portions E1 face each other. End portions E1 of gate device 1-1 and gate device 1-7 are connected so as to block the movement of the person between space P1 and space P2. Gate device 1-2 to gate device 1-6 are disposed in parallel with gate device 1-1, and gate device 1-8 to gate device 1-12 are disposed in parallel with gate device 1-7. In this case, gate device 1-2 to gate device 1-6, and gate device 1-8 to gate device 1-12 are disposed so as to widen space P1 as they are away from gate device 1-1 and gate device 1-7.

In such a layout, entry guide sign 11g of each gate device 1 is rotated to direct to the vicinity of a head of a waiting row of people before recognition. For example, in FIG. 10, in a case where the vicinity of the head of the waiting row of the people before recognition is point PT3, entry guide sign 11g of each gate device 1 (gate device 1-1 to gate device 1-8) is directed in a direction indicated by arrow d3.

In such a layout, display device 13a of each gate device 1 is rotated to direct toward the examiner performing work in office space 2. For example, in FIG. 10, display device 13a of each gate device 1 (gate device 1-1 to gate device 1-8) is directed in a direction indicated by arrow d4.

3. Operation

Next, an example of an operation of gate device 1 will be described.

A person before recognition waits in a row in a waiting place provided in any one of space P1. Next, the target person to whom the face recognition is performed views at entry guide sign 11g and enters gate device 1 where a sign indicating that entry is possible is displayed. In this case, the path of gate device 1 where the sign indicating that the entry is possible is displayed is in a closed state.

Next, when acquiring a detection result indicating that first sensing device 13c and/or second sensing device 13d for detecting the path on the front side of gate device 1 where the target person enters detects the target person approaching the front of face recognition device 12, the control device allows a message prompting the target person to put the passport on passport reader 12d to display on display 12b of face recognition device 12. In addition, since gate device 1 is in use, the control device allows the display of entry guide sign 11g to change to a sign indicating that the entry is impossible.

When the target person puts the passport on the glass surface of passport reader 12d, the face image is acquired from the face photograph (or from data recorded in the passport) attached to the passport and is output to the control device. In addition, camera 12a images the face of the target person and outputs the captured face photograph to the control device. The control device collates the face photograph acquired from passport reader 12d with the face photograph acquired from an imaging unit, and determines whether or not the passage of gate device 1 is permitted.

In a case where the passage of gate device 1 is permitted, that is, the face recognition succeeds, the control device opens the shutter and opens the path. In this case, the control device allows a message prompting the target person to enter the path to display on display 12b of face recognition device 12.

In a case where the passage of gate device 1 is not permitted, that is, the face recognition fails, the control device allows the message prompting the target person to whom the face recognition is performed again to display on display 12b of face recognition device 12.

In addition, the control device allows the progress state of the recognition operation in gate device 1 to be sequentially displayed on display device 13a. For example, the progress state of the recognition operation of each step such as before the face recognition operation, during the face recognition operation, the face recognition success, or the face recognition failure is displayed on display device 13a.

In addition, the control device monitors whether or not the person normally performs the face recognition operation or the like based on the detection result of the person passing through the path on the front side of gate device 1 in first sensing device 13c. In addition, the control device monitors presence or absence of the existence of a person who tries to illegally pass through the path on the rear side (for example, tailgating), or the like based on the detection result of the person passing through the path on the rear side of gate device 1 in second sensing device 13d.

In addition, the control device outputs each data such as the progress state of the recognition operation in gate device 1, the face photograph acquired from passport reader 12d, the face photograph acquired from camera 12a, the result of the face recognition, the detection result of first sensing device 13c, or the detection result of second sensing device 13d to a terminal provided in office space 2 (see FIGS. 8 to 11). The examiner of office space 2 monitors the terminal and checks a situation of the plurality of gate devices 1. In addition, as a result of the check of the situation of the plurality of gate devices 1, the examiner remotely controls gate devices 1 via the terminal of office space 2 if necessary.

4. Effect Etc

As described above in detail, gate device 1 according to the embodiment is disposed between space P1 (first space) where the person waiting for passing exists and space P2 (second space) where the person already passed exists. Gate device 1 includes gate main body 11 disposed along path X1 through which the person existing in space P1 passes when moving to space P2 and first shutter 11a for blocking or opening path X1. In plan view, the width of end portion E1 (first end portion) positioned on space P1 side in the short direction of gate main body 11 is narrower than the width of end portion E2 (second end portion) positioned on space P2 side in the short direction.

With such a configuration, the path on the side on which the person waiting for passage enters can be widely secured, so that it is possible to arrange the gate devices in various disposition patterns to reduce the sense of oppression to the user.

In addition, with such a configuration, the path on the side on which the person waiting for passage enters can be widely secured, so that it is easy to enter gate device 1.

In addition, in such a configuration, the shutter can be accommodated in the end portion on the rear side on which the width is widely formed, and each device including the driver such as a motor or an actuator can be provided on the rear side, so that the size of gate device 1 can be reduced.

In addition, gate device 1 according to the embodiment includes entry guide sign 11g (first display device) indicating whether or not to enter gate device 1 at end portion E1 (first end portion). Entry guide sign 11g (first display device) is disposed in gate main body 11 rotatably in the horizontal direction.

With the configuration, the orientation of entry guide sign 11g can be changed according to the layout (disposition pattern) of gate device 1, so that it is possible to appropriately indicate whether or not to enter gate device 1 in the direction of the person waiting for passage.

In addition, gate device 1 according to the embodiment has second display device 13a indicating the operation state of the person with respect to gate device 1. Second display device 13a is disposed rotatably in the horizontal direction.

With such a configuration, the orientation of second display device 13a can be changed according to the layout (disposition pattern) of gate device 1, so that the operation state of the person with respect to gate device 1 can be appropriately indicated in the direction of the office space where the examiner performs work. Therefore, it is possible to reduce the burden of the examiner.

In addition, in the arrangement structure of gate devices 1 according to the embodiment, two gate devices are disposed so that respective end portions E1 (first end portions) face each other, and are connected so that respective end portions E1 (first end portions) of the two gate devices block the movement of the person. Gate devices other than the two gate devices are disposed in parallel with either one of the two gate devices, so that space P1 (first space) is widened as the devices get away from the two gate devices.

With such a disposition structure, it is possible to dispose more gate devices in a limited space. In addition, even in a case where many gate devices are disposed, the path on the side on which the person waiting for passage enters can be widely secured, so that it is possible to reduce the sense of oppression to the user and it is easy to enter gate device 1.

In addition, even in such a disposition structure, gate device 1 according to the embodiment can change the orientation of entry guide sign 11g, so that it is possible to appropriately indicate whether or not to enter gate device 1 in the direction of the person waiting for passage. In addition, even in such a disposition structure, gate device 1 according to the embodiment can change the orientation of second display device 13a, so that the operation state of the person with respect to gate device 1 can be appropriately indicated in the direction of the office space where the examiner performs work.

In addition, in such a disposition structure, display device 13a is disposed so as to be easy to view from the examiner and entry guide sign 11g is disposed so as to be easy to view from the user of gate device 1.

In addition, gate device 1 according to the embodiment is disposed between space P1 (first space) where the person waiting for passage exists and space P2 (second space) where the person already passed through exists. Gate device 1 includes gate main body 11 disposed along path X1 through which the person passes when the person existing in space P1 moves to space P2, shutter 11a for blocking or opening path X1, and structure 13 disposed on the upper surface of gate main body 11 and having first sensing device 13c for sensing the person passing through path X1, and second sensing device 13d for sensing the person passing through a side opposite to path X1 across gate main body 11.

With the configuration, it is possible to efficiently dispose the device for detecting the person or the like passing through gate device 1 on each of the front side and the rear side of gate main body 11.

In addition, with the configuration, it is possible to eliminate blind spots on the front side and the rear side of gate main body 11, and to assist the examiner for visual monitoring, so that it is possible to reduce a burden of the examiner while preventing fraud passage.

In addition, first sensing device 13c of gate device 1 according to the embodiment detects a state of a person performing an operation of requesting the passage of gate device 1.

With the configuration, the operation of requesting the passage of gate device 1, specifically, in the embodiment, the state of the person to be face-authenticated operation can be detected, so that it is possible to monitor a fraudulent act of the person.

In addition, second sensing device 13d of gate device 1 according to the embodiment detects tailgating on a side opposite to the path across gate main body 11.

With the configuration, it is possible to eliminate the blind spot on the rear side of gate main body 11, and to assist the examiner for visual monitoring, so that it is possible to effectively prevent the tailgating.

Structure 13 of gate device 1 according to the embodiment is a pole extending upward from the upper portion of gate main body 11.

With the configuration, first sensing device 13c and second sensing device 13d can be disposed above gate device 1, so that it is possible to eliminate the blind spot further effectively.

In addition, gate device 1 according to the embodiment includes second display device 13a (display device) indicating an operation state of a person at end portion E2 on a side on which the person leaves. Second display device 13a is disposed in structure 13.

With the configuration, for example, the examiner can appropriately grasp the operation state of the person with respect to gate device 1.

In addition, structure 13 of gate device 1 according to the embodiment is disposed rotatably in the horizontal direction with respect to gate main body 11.

With the configuration, the orientation of second display device 13a can be changed according to the layout (disposition pattern) of gate device 1, so that the operation state of the person with respect to gate device 1 can be appropriately indicated in the direction of the office space where the examiner performs work. Therefore, it is possible to reduce the burden of the examiner.

In addition, gate device 1 according to the embodiment has face recognition device 12. Face recognition device 12 includes camera 12a having the function (vital sensing function) of detecting the biological reaction such as the pulse wave of the target person to be face-authenticated. Camera 12a detects the pulse wave of the person to be face-authenticated, so that even if the person to be face-authenticated attempts to illegally perform the face recognition using a mask, a still image, a moving image, or the like that imitates the face of another person, a fraudulent use can be prevented.

In addition, face recognition device 12 adopts a configuration in which camera 12a, display 12b, and passport reader 12d are integrated. With such a configuration, an intuitive operation by the user is enabled. In addition, with such a configuration, it is possible to reduce the entire size of gate device 1, for example, the length thereof in the longitudinal direction.

In addition, gate device 1 according to the embodiment includes face recognition device 12 where camera 12a is covered by half mirror 12c. The face recognition can be performed on the person to be face-authenticated without being conscious of the presence of camera 12a and without receiving a sense of resistance against camera 12a by covering camera 12a by half mirror 12c. Therefore, a psychological burden of the person to be face-authenticated can be reduced.

In addition, gate device 1 according to the embodiment outputs each data such as the progress state of the recognition operation in gate device 1, the face photograph acquired from passport reader 12d, the face photograph acquired from camera 12a, the result of the face recognition, the detection result of first sensing device 13c, or the detection result of second sensing device 13d to a terminal provided in office space 2. Therefore, the examiner can check the situation of each gate device 1 by the terminal, so that the burden of the examiner can be reduced.

In addition, gate device 1 according to the embodiment includes baggage holding space 11d beside face recognition device 12. Therefore, the person to be face authenticated naturally puts baggage in baggage holding space without being particularly conscious thereof. That is, baggage holding space 11d is provided, so that ease of use can be improved.

In addition, in gate device 1 according to the embodiment, package holding space 11f is provided on the side surface of gate main body 11. Therefore, the person to be face-authenticated puts package such as a carry case on his/her feet without particularly conscious thereof. That is, package holding space 11f is provided, so that ease of use can be improved.

In the embodiment, an example in which end portion E1 and end portion E2 of gate main body 11 have the arc shape is described, but the invention is not limited thereto. Gate main body 11 may have any shape as long as the width of end portion E1 is narrower than the width of end portion E2. For example, gate main body 11 may have a shape in which the width tapers from end portion E2 toward end portion E1 (tapered shape, waterdrop shape, conical shape, or the like).

In addition, in the embodiment, an example in which first sensing device 13c is a monitoring camera for acquiring an image, and second sensing device 13d is a three-dimensional distance image sensor for detecting a distance to an object existing in the detecting range is described, but the invention is not limited thereto. First sensing device 13c and second sensing device 13d may be constituted, for example, by one or a plurality of combinations of a monitoring camera for acquiring the image, a three-dimensional distance image sensor for detecting the distance to the object existing in the detecting range, a vital sensor for detecting the pulse wave of the person or the like, and a thermosensor for detecting heat such as a body temperature.

In addition, gate device 1 having face recognition device 12 is described, but the invention is not limited thereto. The determination as to whether or not a person desiring to pass through gate device 1 passes is not limited to the face recognition, and the passage may be determined by fingerprint recognition, recognition using an ID card, recognition by a ticket, or the like. Alternatively, a combination of a plurality of recognition methods may be provided.

In the embodiment, a configuration in which the shutters of two gate devices 1 arranged side by side across the passage are interlocked so as to execute opening and blocking of the path is described, but the invention is not limited thereto. One gate device may perform opening and blocking of the path on the front side of the gate device. In this case, in the gate device, it is not necessary to provide the shutter on the rear side and opening and blocking of the path may be executed by using the shutter on the front side. For example, by applying a configuration or the like in which the shutter is foldable, opening and blocking of the path can be executed by using the shutter on the front side without changing the entire size of the gate device.

Moreover, in the embodiment, an example in which a person enters from the right side with respect to the front side of gate device 1 is described, but the invention is not limited thereto. The person may pass from the left side with respect to the front side of gate device 1. The configuration and the shape of the gate device through which the person passes from the left side are, for example, a configuration and a shape as if a mirror image of gate device 1 illustrated in FIGS. 1 to 5 is inverted.

Gate device 1 described in the embodiment is a device capable of realizing a strict and smooth immigration examination. In addition, for example, even a first-time user or an elderly person can use gate device 1 without the sense of resistance.

INDUSTRIAL APPLICABILITY

The present disclosure is suitable for a gate system in an airport immigration examination.

REFERENCE MARKS IN THE DRAWINGS 1, 1', 1", 1-1 to 1-12 GATE DEVICE
2 OFFICE SPACE
3 AUXILIARY DEVICE
11 GATE MAIN BODY
11a FIRST SHUTTER
11b SECOND SHUTTER
11c PROTECTION PLATE
11d BAGGAGE HOLDING SPACE
11e FIXED PLATE
11f PACKAGE HOLDING SPACE
11g ENTRY GUIDE SIGN (FIRST DISPLAY DEVICE)
12 FACE RECOGNITION DEVICE
12a CAMERA
12b DISPLAY
12c HALF MIRROR
12d PASSPORT READER
13 STRUCTURE
13a DISPLAY DEVICE (SECOND DISPLAY DEVICE)
13b FRAUD DETECTING SENSOR
13c FIRST SENSING DEVICE
13d SECOND SENSING DEVICE

The invention claimed is:

1. A gate device disposed between a first space, where people wait to pass through, and a second space, where people have already passed through, the device comprising:
a gate main body disposed along a path a person in the first space takes to the second space; and
a first display screen embedded within the gate main body at a first end portion positioned on a first space side, the first display screen indicating whether or not to enter the gate device,
wherein the first display screen is switchably rotatable in a horizontal direction among a plurality of different positions relative to the gate main body.

2. The gate device of claim 1,
wherein the first end portion and a second end portion have a substantially arc shape in plan view, and
wherein a curvature radius of the first end portion is smaller than a curvature radius of the second end portion.

3. The gate device of claim 1, wherein:
in plan view, a width of the first end portion in a short direction of the gate main body is narrower than a width of a second end portion positioned on a second space side in the short direction of the gate main body.

4. The gate device of claim 3, further comprising:
an operating portion for controlling a rotation position of the first display screen.

5. The gate device of claim 1, further comprising:
a second display indicating an operation state of the person with respect to the gate device,
wherein the second display is switchably rotatable independently of the first display screen, in a horizontal direction among a second plurality of different positions with respect to the gate main body.

6. The gate device of claim 5,
wherein a pole having a camera for monitoring a person passing through the path is disposed on an upper surface of the gate main body, and
wherein the second display is disposed on a side surface of the pole.

7. A gate device arrangement structure, in which a plurality of gate devices are disposed between a first space, where people wait to pass through, and a second space, where people have already passed through, wherein:
each of the plurality of gate devices comprises:
a gate main body disposed along a path a person in the first space takes to the second space;
a first end portion positioned on a first space side;
a display screen embedded within the gate main body at the first end portion and being switchably rotatable in a horizontal direction among a plurality of different positions relative to the gate main body, wherein:
two gate devices are disposed so that respective first end portions face each other,
the respective first end portions of the two gate devices are connected so as to block a movement of a person, and
one or more gate devices other than the two gate devices is arranged in parallel with either one of the two gate devices so that the first space is widened as the gate devices are away from the two gate devices.

8. The gate device arrangement structure of claim 7,
wherein a space where an examiner, who monitors a recognition state, performs work is disposed at a place facing side surfaces of the two gate devices.

9. The gate device of claim 1, wherein the first display screen is a liquid crystal display.

10. The gate device of claim 5, wherein the second display includes a light emitting diode.

* * * * *